(12) United States Patent
Mulligan

(10) Patent No.: US 12,549,100 B2
(45) Date of Patent: Feb. 10, 2026

(54) HIGH VOLTAGE GATE DRIVER USING LOW VOLTAGE TRANSISTORS WITH INPUT VOLTAGE REFERENCED SUPPLY REGULATOR

(71) Applicant: Silicon Laboratories Inc., Austin, TX (US)

(72) Inventor: Michael D. Mulligan, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 18/770,247

(22) Filed: Jul. 11, 2024

(65) Prior Publication Data

US 2026/0018994 A1    Jan. 15, 2026

(51) Int. Cl.
*G11C 5/14* (2006.01)
*H02M 3/07* (2006.01)

(52) U.S. Cl.
CPC ............... *H02M 3/07* (2013.01); *G11C 5/145* (2013.01)

(58) Field of Classification Search
CPC .......... G11C 5/145; H02M 3/07; H02M 3/073
USPC ............................................... 327/536
See application file for complete search history.

(56) References Cited

U.S. PATENT DOCUMENTS

| | | | |
|---|---|---|---|
| 5,793,822 A * | 8/1998 | Anderson | H04B 17/20 455/67.14 |
| 6,069,518 A | 5/2000 | Nakai et al. | |
| 8,823,414 B2 | 9/2014 | Thirugnanam et al. | |
| 9,698,654 B2 | 7/2017 | Santos et al. | |
| 10,469,075 B2 | 11/2019 | Horvath | |
| 10,756,538 B2 | 8/2020 | Kaundinya et al. | |
| 10,917,081 B1 | 2/2021 | Nguyen et al. | |
| 11,057,029 B2 | 7/2021 | Westwick et al. | |
| 11,258,432 B1 | 2/2022 | Onody et al. | |
| 11,362,646 B1 | 6/2022 | Tesu et al. | |
| 11,539,350 B2 | 12/2022 | Heckroth et al. | |
| 11,556,144 B2 | 1/2023 | Onody et al. | |
| 11,561,563 B2 | 1/2023 | Zsolczai et al. | |
| 11,817,854 B2 | 11/2023 | Tesu et al. | |
| 2006/0109205 A1 | 5/2006 | Deng | |
| 2010/0060343 A1 * | 3/2010 | Saitoh | H02M 3/073 327/536 |
| 2015/0270393 A1 | 9/2015 | Kumar | |
| 2016/0072382 A1 | 3/2016 | Ranmuthu | |
| 2019/0214975 A1 | 7/2019 | Yang | |

(Continued)

*Primary Examiner* — William Hernandez
(74) *Attorney, Agent, or Firm* — Zagorin Cave LLP

(57) ABSTRACT

A regulated charge pump circuit supplies an output voltage. A reference generation circuit generates a feedback current used to generate a level shifted version of the output voltage as a feedback voltage. A charge pump clock generation circuit generates a clock signal for the charge pump according to the difference between a reference voltage and the feedback voltage. The charge pump boosts the reference voltage. The feedback current flows through a feedback resistor coupled between an output of the charge pump and an input of the charge pump clock generation circuit to generate the feedback voltage. An amplifier in the reference generation circuit generates a gate signal for a transistor based on a reference voltage and another feedback voltage generated using the feedback current flowing through a reference resistor. The transistor controls the feedback current, which flows through the feedback resistor, the transistor, and the reference resistor.

20 Claims, 3 Drawing Sheets

(56) References Cited

U.S. PATENT DOCUMENTS

2021/0281170 A1  9/2021  Asam et al.
2022/0181968 A1  6/2022  Mao

* cited by examiner

HIGH VOLTAGE GATE DRIVER USING LOW VOLTAGE TRANSISTORS WITH INPUT VOLTAGE REFERENCED SUPPLY REGULATOR

CROSS-REFERENCE TO RELATED APPLICATION(S)

This application relates to the application entitled "Timing Based Signal Valley Detection", naming Bhavna Rachuri and Michael D. Mulligan as inventors, application Ser. No. 18/633,257, filed Apr. 11, 2024, which application is incorporated herein by reference.

BACKGROUND

Field of the Invention

This disclosure relates to boosting voltage on an integrated circuit using a charge pump.

Description of the Related Art

Many integrated circuits utilize supply voltages that are well below the voltages required for interfacing to external components and utilize transistors that cannot support the required voltages needed to interface to external components. Such integrated circuits need to increase the available voltage to the voltage necessary for interfacing with external components.

SUMMARY OF EMBODIMENTS OF THE INVENTION

Accordingly, embodiments described herein use a regulated charge pump architecture to boost an available voltage to a higher voltage needed for interfacing to higher voltage external components.

In an embodiment an apparatus includes a regulated charge pump circuit that supplies an output voltage and a voltage-to-current reference generation circuit. The voltage-to-current reference generation circuit receives a first reference voltage and is configured to generate a feedback current. The feedback current is used to generate a feedback voltage that is a level shifted version of the output voltage and the feedback voltage is used in regulation of the regulated charge pump circuit. In an embodiment the regulated charge pump circuit includes a charge pump clock generation circuit that receives a charge pump reference voltage and the feedback voltage and generates one or more charge pump clock signals according to a difference between the charge pump reference voltage and the feedback voltage.

In another embodiment a method includes supplying an output voltage from a regulated charge pump circuit and generating a feedback current using a voltage-to-current reference generation circuit. The method further includes generating a feedback voltage using the feedback current, the feedback voltage being a level shifted version of the output voltage. A charge pump reference voltage and the feedback voltage are supplied to a charge pump clock generation circuit, which generates a charge pump clock signal according to a difference between the charge pump reference voltage and the feedback voltage.

In another embodiment an apparatus includes a regulated charge pump circuit to supply an output voltage. A voltage-to-current reference generation circuit is coupled to receive a first reference voltage and is configured to generate a feedback current, the feedback current being used to generate a feedback voltage that is a level shifted version of the output voltage. The regulated charge pump circuit includes a charge pump clock generation circuit coupled to receive the feedback voltage on a first circuit input and to receive a second reference voltage on a second circuit input and the charge pump clock generation circuit is configured to generate a charge pump clock signal according to a difference between the second reference voltage and the feedback voltage. A charge pump is coupled to receive the charge pump clock signal and supply the output voltage. A feedback resistor is coupled between an output of the charge pump and the first circuit input and is coupled to receive the feedback current to thereby generate the feedback voltage.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
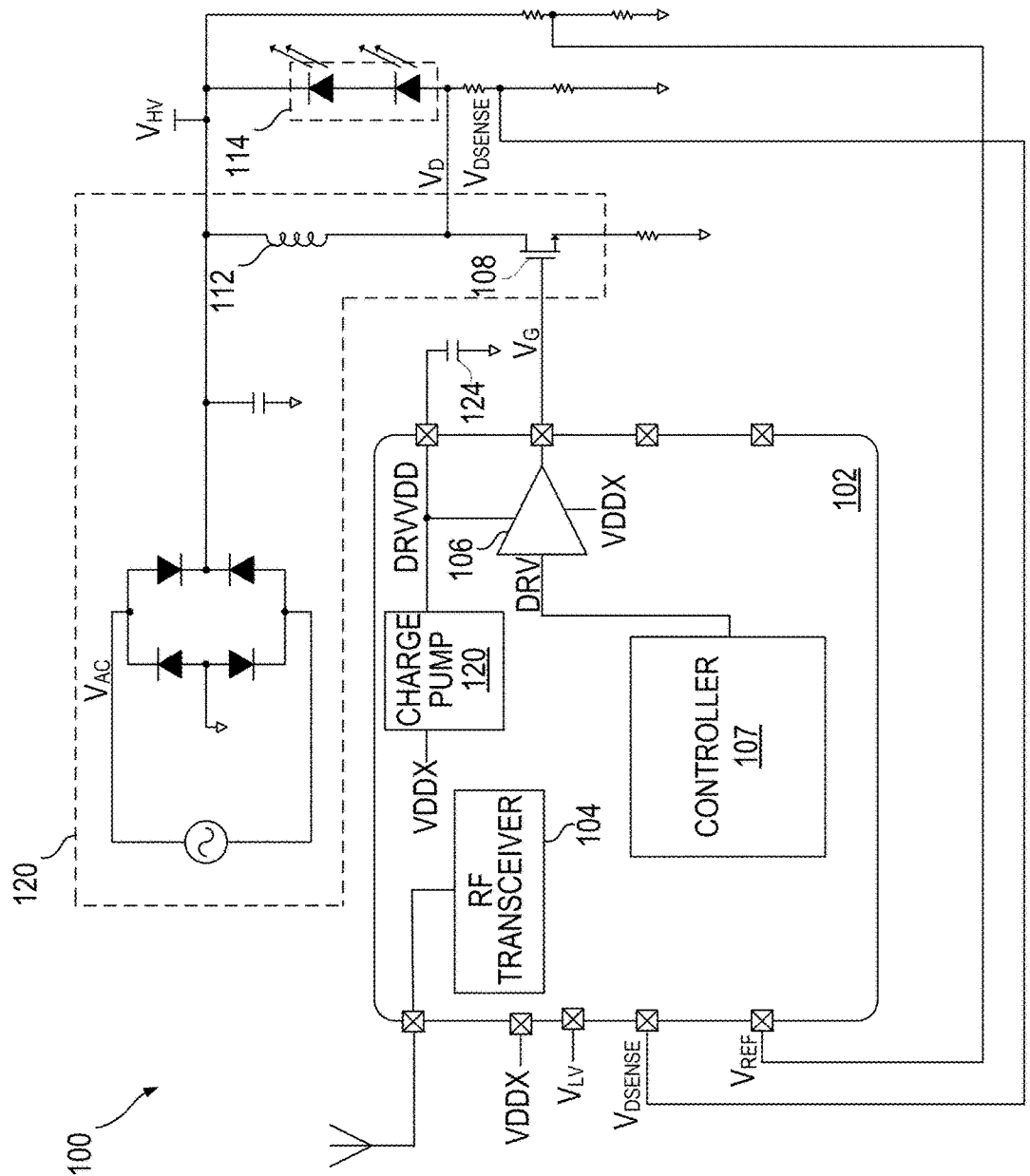
FIG. 1 illustrates an LED system that utilizes one or more embodiments described herein.

Referring to FIG. 1 a wireless light-emitting diode (LED) lamp 100 includes a microcontroller unit (MCU) device 102 with wireless functionality. The MCU 102 includes a radio frequency (RF) communication circuit 104 to provide the wireless functionality needed to communicate over short range wireless protocols such as Bluetooth and/or Zigbee. In other embodiments, the RF transceiver and the LED driver circuit are in separate devices or the RF transceiver is not included at all. The MCU further includes an LED driver circuit 106. The LED driver circuit 106 provides gate control signal $V_G$, which is based on a pulse-width modulated control signal (e.g., 1 kHz), to power switch 108.

In an embodiment, when power switch 108 is on, a current through inductor 112 increases from zero and energy transfers to the magnetic field of inductor 112. When enough energy is stored by inductor 112, gate control signal $V_G$ turns off power switch 108 and inductor 112 delivers stored energy to LED circuit 114. The current through inductor 102 ramps down to zero and completely demagnetizes inductor 102 every period of gate control signal $V_G$.

In at least one embodiment, LED driver circuit 106 generates pull-up and pull-down control signals based on control signal(s) DRV. Charge pump 120 boosts an input voltage VDDX to the driver supply voltage DRVVDD, and LED driver circuit 106 uses that voltage to level shift the pull-up and pull-down control signals to generate gate control signal $V_G$ in a voltage domain suitable for driving power switch 108. As explained further herein that same voltage (VDDX) is used as a bias voltage for cascode devices in the driver circuit 106. In at least one embodiment, driver circuit 106 includes a stack of transistors including complementary switching devices stacked with corresponding cascode devices that are biased to limit switching device stresses. In general, the target manufacturing process may provide transistors having different breakdown voltages and speeds of operation as a result of gate terminals formed using oxide layers of different thicknesses. An exemplary high-voltage transistor has a thicker gate oxide and therefore has a higher breakdown voltage but is slower than a low-voltage transistor that has a thinner gate oxide thickness. Transistors of integrated circuit device 102 are low-voltage transistors operating at voltage levels consistent with low voltage power supply $V_{LV}$ (e.g., 3.3V). In an embodiment the LED driver 106 needs to drive up to at least, e.g., 7V, but many processes do not provide transistors that can tolerate those voltage levels. Accordingly, cascode devices are utilized to limit switching device stresses and allow a driver structure that tolerates the boosted driver supply voltage DRVVDD.

Figure 2:
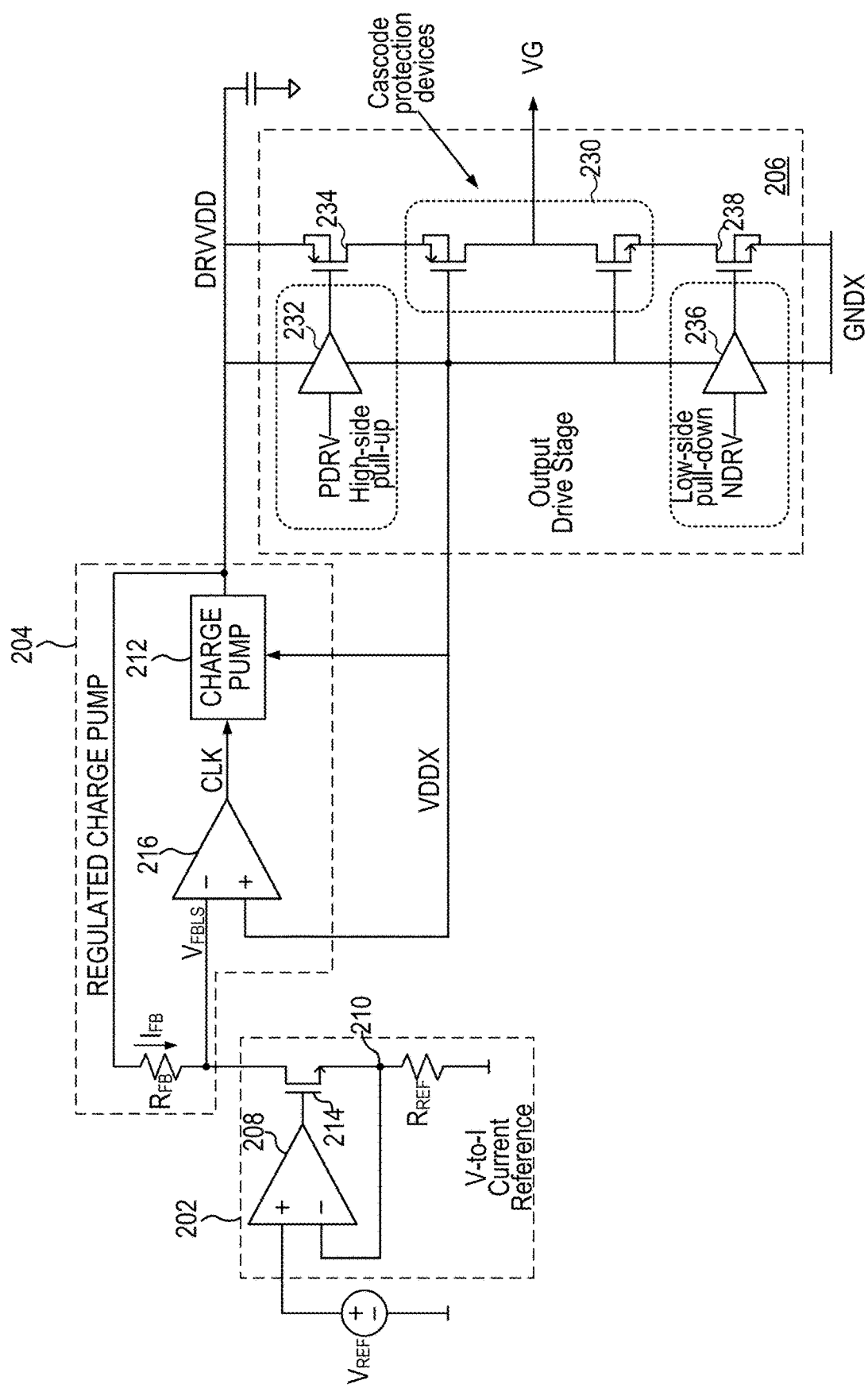
FIG. 2 illustrates embodiments of a voltage-to-current reference generation circuit, a regulated charge pump circuit, and an output driver circuit.

FIG. 2 illustrates additional details of an embodiment of the regulated charge pump circuit and output driver. FIG. 2 shows the voltage-to-current (V-to-I) reference generation circuit 202, a regulated charge pump circuit 204 that is an embodiment of charge pump 120 shown in FIG. 1, and an output driver circuit 206 that is an embodiment of the LED driver circuit 106 shown in FIG. 1. Note that while shown and described separately, the V-to-I reference generation circuit 202 can be considered part of the regulated charge pump 204 or as a separate circuit. The V-to-I reference generation circuit 202 provides a current used in charge pump regulation. The reference voltage $V_{REF}$ is supplied to the positive input of amplifier 208. The negative input of amplifier 208 is fed back from node 210. The reference generation circuit 202 uses the ground-referenced voltage $V_{REF}$ to force a voltage drop in the feedback voltage of the regulated charge pump to create a level shifted feedback voltage $V_{FBLS}$ that is used to regulate the charge pump 212. The V-to-I reference generator circuit includes a resistor $R_{REF}$ coupled between node 210 and ground. The amplifier 208 supplies a gate control signal to transistor 214 to control the current flowing through $R_{REF}$ to maintain the voltage at node 210 across resistor $R_{REF}$ equal to the reference voltage $V_{REF}$. That results in the V-to-I generator 202 creating a feedback current $I_{FB}=V_{REF}/R_{REF}$. The feedback current $I_{FB}$ also flows through the resistor REB to create the level shifted feedback voltage $V_{FBLS}$ supplied to the charge pump clock generation circuit 216. The level shifted feedback voltage $V_{FBLS}=DRVVDD-(I_{FB} \times R_{FB})$, where DRVVDD is the output of the charge pump 212 supplied as the supply voltage to the driver circuit 206.

Typically, the output voltage (DRVVDD) of the regulated charge pump circuit would be referenced to ground to target a specific voltage relative to 0V. In at least one embodiment, in order to ensure ample headroom for proper operation of the high-side drive circuitry in the LED driver circuit 106, the charge pump supply voltage is regulated to a target voltage above the charge pump's input voltage, which also serves as an elevated "ground" reference for the high-side switching circuitry, as a bias voltage for the gates of cascode devices 230, and the supply voltage for low-side switching circuitry in driver circuit 206.

Still referring still to FIG. 2, the charge pump clock signal generation circuit 216 receives the voltage VDDX as a charge pump reference voltage and the feedback voltage $V_{FBLS}$. The charge pump clock generation circuit 216 functions as a comparator and differential oscillator as described further herein. In an embodiment the charge pump reference voltage VDDX is also used as the bias voltage for the cascode devices used in the output driver. In an embodiment the bias voltage VDDX is supplied from off-chip. In other embodiments, VDDX is supplied from a separate voltage generator/regulator on chip. VDDX has a voltage value between DRVVDD and ground. The specific value of VDDX depends, e.g., on such factors as the particular voltage boost required, the process technology used for the transistors in the LED driver circuit, and how much headroom is desired for the particular application. The charge pump clock generation circuit 216 compares the level-shifted feedback voltage $V_{FBLS}$ to VDDX and generates a clock signal (CLK) for the charge pump 212 that has a frequency based on the difference between $V_{FBLS}$ and DRVVDD. When $V_{FBLS}-VDDX<0$, the charge pump clock generation circuit 216 generates a clock signal whose frequency is a function of $V_{FBLS}-VDDX$. When $V_{FBLS}-VDDX>0$, the CLK signal is static. Negative feedback forces $V_{FBLS}=VDDX$ so that the charge pump output voltage $DRVVDD=VDDX+(I_{FB} \times R_{FB})$. Remember that $I_{FB}=V_{REF}/R_{REF}$. By selecting $V_{REF}$, $R_{REF}$, and $R_{FB}$, the headroom for the high side pull-up drive circuitry in the output driver circuit 206 can be well controlled.

Figure 3:
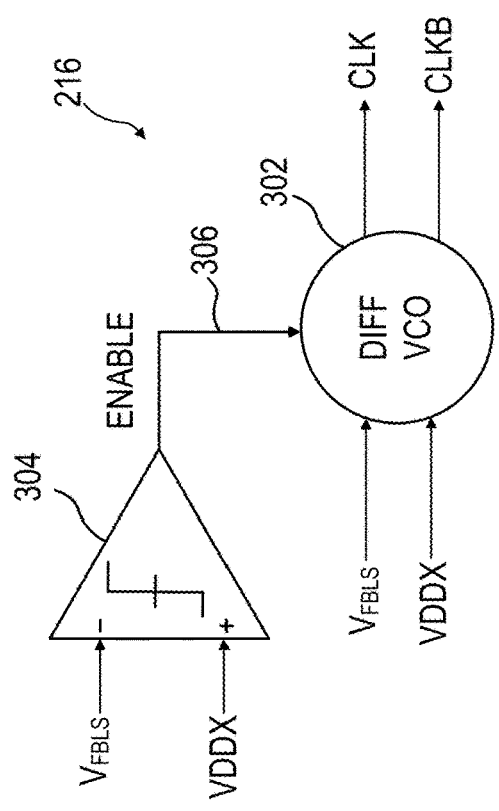
FIG. 3 illustrates a conceptual block diagram of the charge pump clock generation circuit that generates the charge pump clock signal(s).

FIG. 3 illustrates a conceptual block diagram of the charge pump clock generation circuit 216. The level-shifted feedback signal $V_{FBLS}$ and the bias voltage VDDX are supplied to a differential voltage controlled oscillator (VCO) 302 providing the differential oscillator functionality. The differential VCO 302 supplies the clock signals CLK and its complement CLKB used by the charge pump. Various differential oscillators are known in the art and can be implemented, e.g., using a ring oscillator. The frequency of the oscillator output changes according to the difference between the two input signals $V_{FBLS}$ and VDDX. In addition, the two input signals $V_{FBLS}$ and VDDX are supplied to a comparator circuit 304. The comparator circuit supplies an enable signal 306 to the differential VCO. When $V_{FBLS}<VDDX$, the enable signal 306 is asserted and the differential VCO supplies a signal to the charge pump having a frequency that is proportional to the absolute value of the difference between $V_{FBLS}$ and VDDX. When $V_{FBLS}>VDDX$, the enable signal is deasserted by the comparator and the VCO output is static rather than oscillating.

Referring back to FIG. 2, the block diagram of the driver circuit 206 includes the cascode protection devices 230 receiving VDDX as the bias voltage. The high side pull-up buffer 232 receives a drive signal PDRV from controller 107 (see FIG. 1) and drives the pull-up transistor 234 and the low side pull-down buffer 236 receives the drive signal NDRV from controller 107 and drives the pull-down transistor 238. As mentioned earlier the cascode protection devices 230 that receive the bias voltage VDDX at their gates limit switching device stresses and allow a driver structure that tolerates the boosted voltage DRVVDD.

In other embodiments, the regulated charge pump is decoupled from the bias voltage supplied to the cascode transistors used in the stack. Instead, a standard charge pump or boost regulator supplies the driver output voltage and thus the boosted output voltage is decoupled from the driver cascode/level-shifted pull-up "ground" level.

Figure 4:
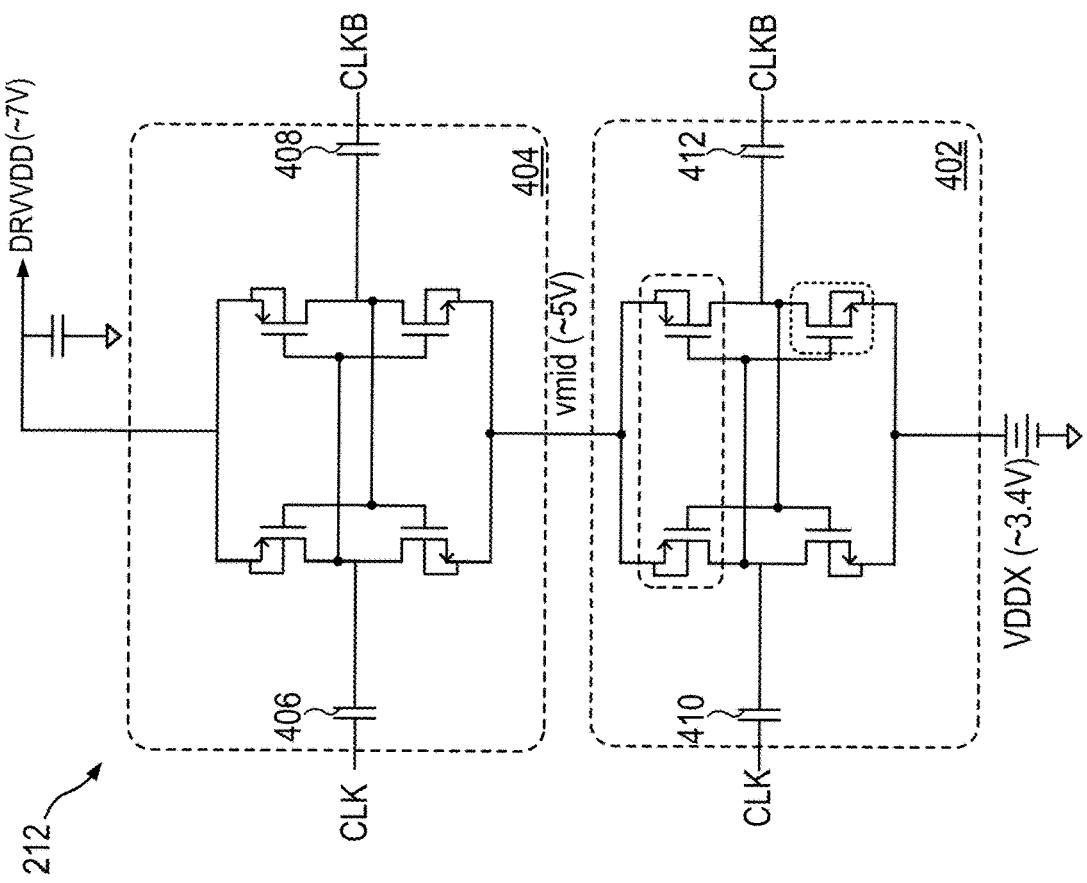
FIG. 4 illustrates an embodiment of a charge pump circuit.

FIG. 4 illustrates an exemplary embodiment of charge pump 212. The illustrated charge pump includes two stages, stage 402 and 404. In the illustrated embodiment the first stage 402 boosts the voltage from VDDX to an intermediate voltage of ~5V. The second stage boosts the voltage from 5V to ~7V. The voltages given are only examples and other voltages are utilized in other embodiments according to system needs. Both stages receive the CLK signal (and its complement CLKB) from the differential oscillator circuit 216. The higher the frequency of CLK the faster the input voltage VDDX is boosted. In embodiments flying capacitors 406 and 408 in the second stage may be implemented as finger capacitors. In the first stage the flying capacitors 410 and 412 may be implemented as device capacitors. Of course, other charge pump topologies may be used to generate DRVVDD.

It is noted that the functional blocks, devices, and/or circuitry described herein can be implemented using various combinations of analog circuits, digital circuits, and programmable circuits such as software programmed on a microcontroller unit (MCU) or other processor to provide the functionality described herein.

A regulated charge pump has been described. The description of the invention set forth herein is illustrative and is not intended to limit the scope of the invention as set forth in the following claims. For example, equivalent elements may be substituted for those illustrated and described herein, and certain features may be utilized independently of the use of other features, as would be apparent to one skilled in the art having the benefit of this description. Note that the terms "first," "second," "third," and so forth, as used in the claims, unless otherwise clear by context, is to distinguish between different items in the claims and do not otherwise indicate or imply any order in time, location, or quality. Variations and modifications of the embodiments disclosed herein may be made based on the description set forth herein, without departing from the scope of the invention as set forth in the following claims.

What is claimed is:

1. An apparatus comprising:
   a regulated charge pump circuit to supply an output voltage;
   a voltage-to-current reference generation circuit; and
   wherein the voltage-to-current reference generation circuit is coupled to receive a first reference voltage and is configured to generate a feedback current, the feedback current being used to generate a feedback voltage that is a level shifted version of the output voltage, the feedback voltage being used in regulation of the regulated charge pump circuit.

2. The apparatus as recited in claim 1 wherein the regulated charge pump circuit further comprises a charge pump clock generation circuit configured to receive a charge pump reference voltage and the feedback voltage and to generate one or more charge pump clock signals according to a difference between the charge pump reference voltage and the feedback voltage.

3. The apparatus as recited in claim 2 wherein the one or more charge pump clock signals are static when the charge pump reference voltage is less than the feedback voltage.

4. The apparatus as recited in claim 2 wherein the regulated charge pump circuit further comprises a pump circuit coupled to receive the one or more charge pump clock signals and boost an input voltage to the output voltage.

5. The apparatus as recited in claim 4 further wherein the input voltage is the charge pump reference voltage.

6. The apparatus as recited in claim 2 wherein the regulated charge pump circuit further comprises a feedback resistor coupled between an output of the regulated charge pump circuit and a first node, the first node being coupled to a first input of the charge pump clock generation circuit and the first node having the feedback voltage and the first node coupled to receive the feedback current flowing through the feedback resistor.

7. The apparatus as recited in claim 6 wherein the output voltage is regulated to (the charge pump reference voltage+ ($I_{FB} \times R_{FB}$)), where $I_{FB}$ is the feedback current and $R_{FB}$ is a resistance of the feedback resistor.

8. The apparatus as recited in claim 6 wherein the voltage-to-current reference generation circuit further comprises a reference resistor coupled between a second node and a ground node, the feedback current through the reference resistor being controlled by the voltage-to-current reference generation circuit and the feedback current being equal to $V_{REF}/R_{REF}$, where $V_{REF}$ is the first reference voltage and $R_{REF}$ is a resistance of the reference resistor.

9. The apparatus as recited in claim 8 wherein the voltage-to-current reference generation circuit comprises an amplifier circuit coupled to receive the first reference voltage at a positive input and to receive another voltage at its negative input, the other voltage based on the feedback current through the reference resistor, the amplifier circuit further configured to supply a gate control signal.

10. The apparatus as recited in claim 9 wherein the voltage-to-current reference generation circuit comprises a transistor having a control node coupled to the gate control signal and having a first current carrying node coupled to the first node and a second current carrying node coupled to the second node.

11. The apparatus as recited in claim 2 wherein the first reference voltage is ground-referenced and the charge pump reference voltage is between ground and the output voltage.

12. The apparatus as recited in claim 2 further comprising:
    an output driver circuit coupled to receive the output voltage; and
    a plurality of cascode protection devices in the output driver circuit coupled to receive the charge pump reference voltage as a bias voltage.

13. A method comprising:
    supplying an output voltage from a regulated charge pump circuit;
    generating a feedback current using a voltage-to-current reference generation circuit;
    generating a feedback voltage using the feedback current, the feedback voltage being a level shifted version of the output voltage;
    supplying a charge pump reference voltage and the feedback voltage to a charge pump clock generation circuit; and
    generating a charge pump clock signal in the charge pump clock generation circuit according to a difference between the charge pump reference voltage and the feedback voltage.

14. The method as recited in claim 13 further comprising:
    supplying the charge pump reference voltage to a charge pump in the regulated charge pump circuit;
    supplying the charge pump clock signal to the charge pump; and
    boosting the charge pump reference voltage to the output voltage using the charge pump.

15. The method as recited in claim 14 further comprising:
    generating the feedback voltage using the feedback current flowing through a feedback resistor coupled between an output of the regulated charge pump circuit and a first node, the first node being coupled to an input of the charge pump clock generation circuit; and
    causing the feedback current to flow through the feedback resistor and the first node, thereby causing the first node to have the feedback voltage.

16. The method as recited in claim 15 wherein generating the feedback current further comprises:

supplying another reference voltage to a first input of an amplifier circuit in the voltage-to-current reference generation circuit;

generating another voltage using the feedback current flowing through a reference resistor coupled between a second node and ground;

supplying the other voltage to the amplifier circuit and generating a gate control signal in the amplifier circuit based on the other reference voltage and the other voltage; and supplying the gate control signal to a transistor having its current carrying nodes coupled between the reference resistor and the feedback resistor; and causing the feedback current to flow through the feedback resistor, the transistor, and the reference resistor.

17. The method as recited in claim 13 further comprising:

supplying the output voltage to an output driver circuit; and supplying a plurality of cascode protection devices in the output driver circuit with the charge pump reference voltage.

18. An apparatus comprising:

a regulated charge pump circuit to supply an output voltage;

a voltage-to-current reference generation circuit coupled to receive a first reference voltage and configured to generate a feedback current, the feedback current being used to generate a feedback voltage that is a level shifted version of the output voltage;

wherein the regulated charge pump circuit includes,
  a charge pump clock generation circuit coupled to receive the feedback voltage on a first circuit input and to receive a charge pump reference voltage on a second circuit input and the charge pump clock generation circuit is configured to generate a charge pump clock signal according to a difference between the charge pump reference voltage and the feedback voltage;
  a charge pump coupled to receive the charge pump clock signal and supply the output voltage; and
  a feedback resistor coupled between an output of the charge pump and the first circuit input and coupled to receive the feedback current used to generate the feedback voltage.

19. The apparatus as recited in claim 18 wherein the charge pump clock signal is static when the charge pump reference voltage is less than the feedback voltage.

20. The apparatus as recited in claim 18 wherein the voltage-to-current reference generation circuit comprises,
  an amplifier circuit coupled to supply a gate control signal based on a difference between a first reference voltage and to receive a second feedback voltage;
  a reference resistor coupled between ground and an input to the amplifier circuit;
  a transistor coupled between the feedback resistor and the reference resistor and having a gate coupled to the gate control signal, the feedback current flowing through the transistor being determined according to the gate control signal; and
  wherein the second feedback voltage is determined according to the feedback current and the reference resistor.

* * * * *